United States Patent
Takahashi (10) Patent No.: US 10,363,849 B2
(45) Date of Patent: Jul. 30, 2019

(54) VEHICLE SEAT

(71) Applicant: TOYOTA JIDOSHA KABUSHIKI KAISHA, Toyota-shi, Aichi-ken (JP)

(72) Inventor: Gen Takahashi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 14/887,881

(22) Filed: Oct. 20, 2015

(65) Prior Publication Data

US 2016/0137113 A1 May 19, 2016

(30) Foreign Application Priority Data

Nov. 13, 2014 (JP) .................................. 2014-230647

(51) Int. Cl.
*B60N 2/70* (2006.01)

(52) U.S. Cl.
CPC .................... *B60N 2/7094* (2013.01)

(58) Field of Classification Search
CPC .................................................... B60N 2/7094
See application file for complete search history.

(56) References Cited

U.S. PATENT DOCUMENTS

| | | | | | |
|---|---|---|---|---|---|
| 4,357,005 | A | * | 11/1982 | Bourke | A47C 7/32 267/142 |
| 4,606,532 | A | * | 8/1986 | Kazaoka | A47C 7/282 267/102 |
| 4,969,687 | A | * | 11/1990 | Higuchi | B60N 2/72 297/452.18 |
| 5,284,381 | A | * | 2/1994 | Aoki | B60N 2/68 297/452.1 |
| 8,662,483 | B2 | | 3/2014 | Yamaguchi et al. | |
| 2004/0256905 | A1 | | 12/2004 | Fujita | |
| 2007/0040311 | A1 | * | 2/2007 | Maas | A47C 7/025 267/142 |
| 2009/0051206 | A1 | * | 2/2009 | Fujita | B60N 2/7094 297/452.49 |
| 2013/0140859 | A1 | * | 6/2013 | Yamaki | B60N 2/4235 297/216.13 |

(Continued)

FOREIGN PATENT DOCUMENTS

| | | |
|---|---|---|
| CN | 104029619 A | 9/2014 |
| EP | 0090622 A1 | 10/1983 |

(Continued)

OTHER PUBLICATIONS

Jun. 2, 2017 Office Action issued in Chinese Patent Application No. 201510696299.3.

*Primary Examiner* — David R Dunn
*Assistant Examiner* — Tania Abraham
(74) *Attorney, Agent, or Firm* — Oliff PLC (57) ABSTRACT

The present disclosure provides a vehicle seat including: a seat cushion frame that forms a frame of a seat cushion to support buttocks and thighs of a seated occupant; a center section spring that spans along a seat front-rear direction of the seat cushion frame at a center section in a seat width direction; and two end section springs, disposed at a same position in a seat up-down direction as the center section spring in a seat side view, that span along the seat front-rear direction of the seat cushion frame at two end sections in the seat width direction, and that are set with a higher spring constant than the center section spring.

5 Claims, 5 Drawing Sheets

(56) References Cited

U.S. PATENT DOCUMENTS

| | | | |
|---|---|---|---|
| 2013/0270878 A1* | 10/2013 | Adachi | B60N 2/4228 297/216.14 |
| 2014/0225407 A1 | 8/2014 | Nagayasu | |
| 2015/0032037 A1 | 1/2015 | Nakano et al. | |

FOREIGN PATENT DOCUMENTS

| | | |
|---|---|---|
| EP | 1 593 547 A1 | 11/2005 |
| EP | 2 534 979 A1 | 12/2012 |
| GB | 445471 A | 4/1936 |
| GB | 2 342 287 A | 4/2000 |
| JP | 2010-125122 A | 6/2010 |
| JP | 2010-259685 A | 11/2010 |
| JP | 2013-188435 A | 9/2013 |
| JP | 2014-171506 A | 9/2014 |
| WO | 2013/167505 A1 | 11/2013 |

\* cited by examiner

VEHICLE SEAT

CROSS-REFERENCE TO RELATED APPLICATION

This application claims priority under 35 USC 119 from Japanese Patent Application No. 2014-230647, filed on Nov. 13, 2014, the disclosure of which is incorporated by reference herein.

BACKGROUND

Technical Field

The present disclosure relates to a vehicle seat.

Related Art

Japanese Patent Application Laid-Open (JP-A) No. 2010-125122 describes a vehicle seat including a seat cushion frame (seat frame) forming a frame of a seat cushion, and a shock-absorber bridging across the seat cushion frame and supporting a seat cushion pad (pad) attached to the seat cushion frame. The shock absorber is configured including plural springs (wires) retained by the seat cushion frame at both end portions of the shock absorber, and a resin member is attached to portions of the springs. Noise from the springs is thereby suppressed from occurring, when the springs deform.

Although the technology described in JP-A No. 2010-12122 is useful for suppressing the occurrence of noise, there is room for improvement from the perspective of improving hold performance with respect to a seated occupant tilting in a seat width direction.

SUMMARY

The present disclosure provides a vehicle seat that may improve holding performance with respect to a seated occupant tilting in a seat width direction.

A vehicle seat according to a first aspect includes: a seat cushion frame that forms a frame of a seat cushion to support buttocks and thighs of a seated occupant; a center section spring that spans along a seat front-rear direction of the seat cushion frame at a center section in a seat width direction; and two end section springs, disposed at a same position in a seat up-down direction as the center section spring in a seat side view, that span along the seat front-rear direction of the seat cushion frame at two end sections in the seat width direction, and that are set with a higher spring constant than the center section spring.

In the vehicle seat of the first aspect, load of a seated occupant is supported by the seat cushion frame and the center section spring and the two end section springs spanning across the seat cushion frame. In the first aspect, the spring constant of the two end section springs is set higher than the spring constant of the center section spring. Namely, the rigidity of the two end section springs in the seat up-down direction is set higher than the rigidity of the center section spring in the seat up-down direction. Accordingly, the holding performance with respect to the seated occupant tilting in the seat width direction may be improved.

According to the second aspect, the vehicle seat of the above first aspect may further include a connecting member that links the center section spring and the two end section springs in the seat width direction.

In the vehicle seat of the second aspect, the center section spring and the two end section springs are connected by the connecting member, thereby enabling increased reaction force toward the seat upper side to act on the seated occupant from the two end section springs when the seated occupant tilts in the seat width direction. Accordingly, the holding performance with respect to the seated occupant tilting in the seat width direction may be further improved.

According to the third aspect, in the vehicle seat of the above second aspect, a pair of the connecting members may be respectively disposed at a seat front side and a seat rear side of hip points of a seated occupant.

In the vehicle seat of the third aspect, the pair of connecting members are disposed in the positions described above with respect to the hip points of the seated occupant. Accordingly, the holding performance with respect to the seated occupant tilting in the seat width direction may be improved, while suppressing the seated occupant from feeling any hardness in the seat cushion.

Thus, the vehicle seat of the first aspect may improve the holding performance with respect to a seated occupant tilting in the seat width direction.

Further, the vehicle seat of the second aspect may suppress a reduction in ride comfort and may improve the holding performance with respect to a seated occupant tilting in the seat width direction.

Furthermore, the vehicle seat of the third aspect may suppress a reduction in ride comfort and may improve the holding performance with respect to a seated occupant tilting in the seat width direction.

BRIEF DESCRIPTION OF THE DRAWINGS

Exemplary embodiments will be described in detail based on the following figures, wherein.

DETAILED DESCRIPTION OF THE INVENTION

Explanation follows regarding a vehicle seat according to an exemplary embodiment of the present invention, with reference to FIG. 1 to FIG. 4. Note that, in the following explanation, explanation referring to the front-rear, left-right and up-down directions refers to the front-rear, left-right and up-down directions viewed by an occupant seated in the vehicle seat. Moreover, in each of the drawings, the arrow FR indicates the seat front direction, the arrow UP indicates the seat upward direction, the arrow RH indicates the seat right direction, and the arrow LH indicates the seat left direction, as appropriate.

Figure 2:
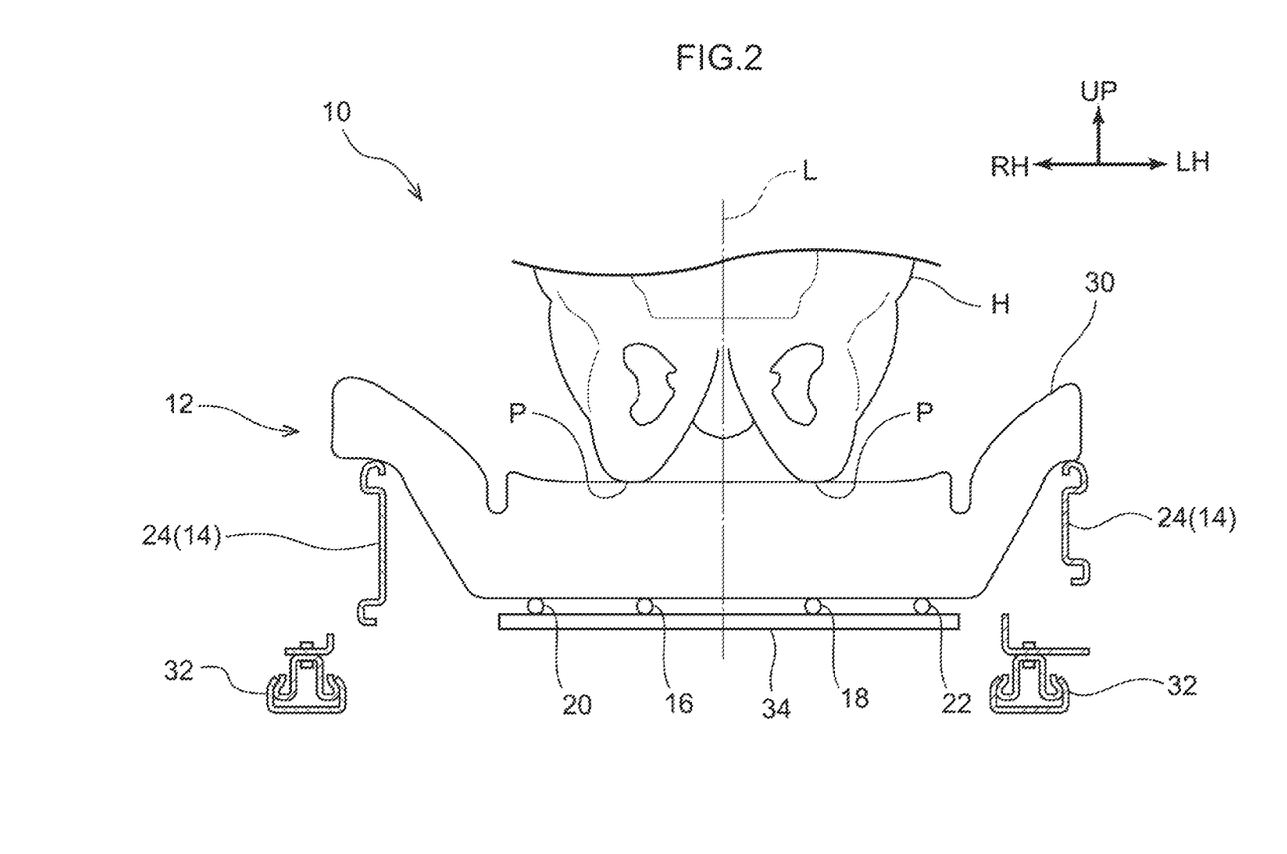
FIG. 2 is a cross-sectional view illustrating the seat cushion illustrated in FIG. 1, cut away along line 2-2.

As illustrated in FIG. 2, a vehicle seat 10 of the present exemplary embodiment is configured including a seat cushion 12 that supports buttocks and thighs of a seated occupant H, and a seatback (not illustrated) that supports the back of the seated occupant H and is attached to a rear end section of the seat cushion 12 so as to be capable of reclining.

The seat cushion 12 includes a seat cushion frame 14 forming a frame of the seat cushion 12, a right side center section spring 16 and a left side center section spring 18 that serve as center section springs spanning across the seat cushion frame 14, and a right side end section spring 20 and a left side end section spring 22 that serve as two end section springs spanning across the seat cushion frame 14 at respective seat width direction outsides of the right side center section spring 16 and the left side center section spring 18.

Figure 1:
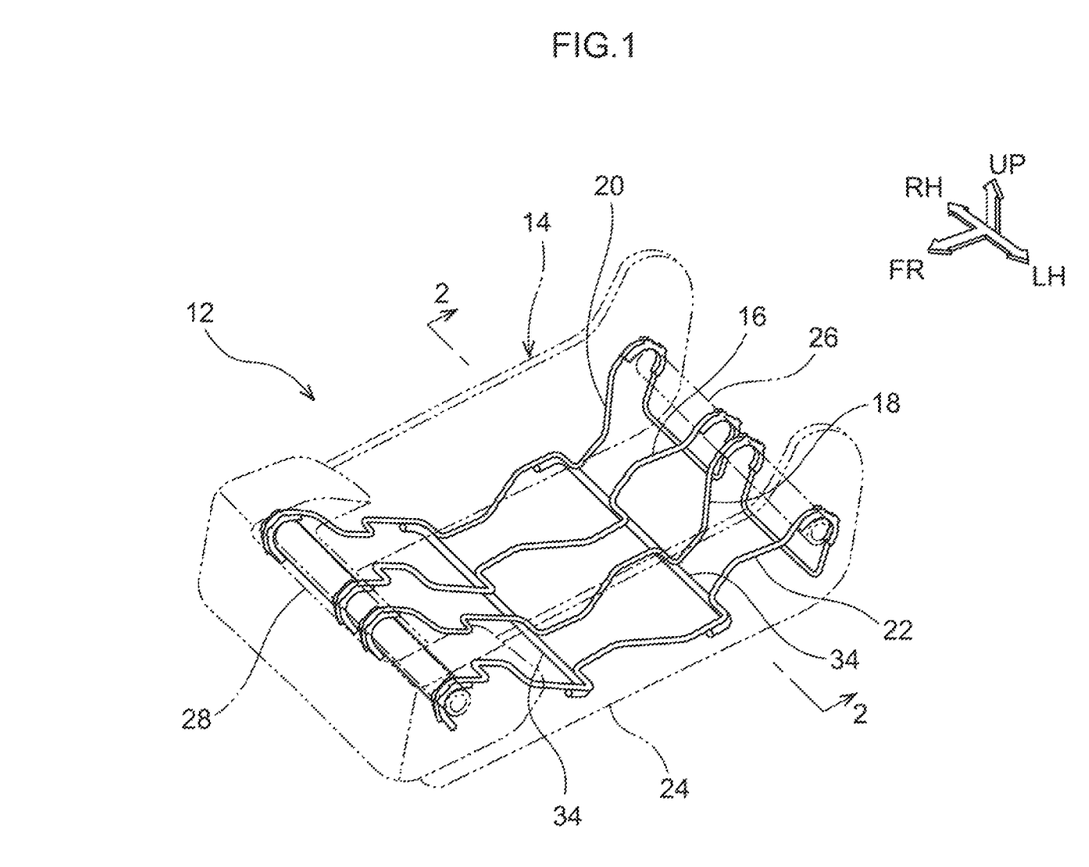
FIG. 1 is a perspective view illustrating a seat cushion frame, a center section spring, two end section springs, etc. of a seat cushion according to an exemplary embodiment.

As illustrated in FIG. 1, the seat cushion frame 14 is formed in a rectangular shape in a seat plan view. The seat cushion frame 14 includes a pair of side frames 24 extending along the seat front-rear direction and disposed with an interval along the seat width direction therebetween, and a rear frame 26 linking together seat rear side end portions of the pair of side frames 24 along the seat width direction. The seat cushion frame 14 also includes a front frame 28 linking together seat front side end portions of the pair of side frames 24 along the seat width direction. As illustrated in FIG. 2, a seat cushion pad 30, covered by a cover member, is attached to the seat cushion frame 14 described above. The seat cushion frame 14 is attached to a vehicle floor through slide rails 32.

Figure 3:
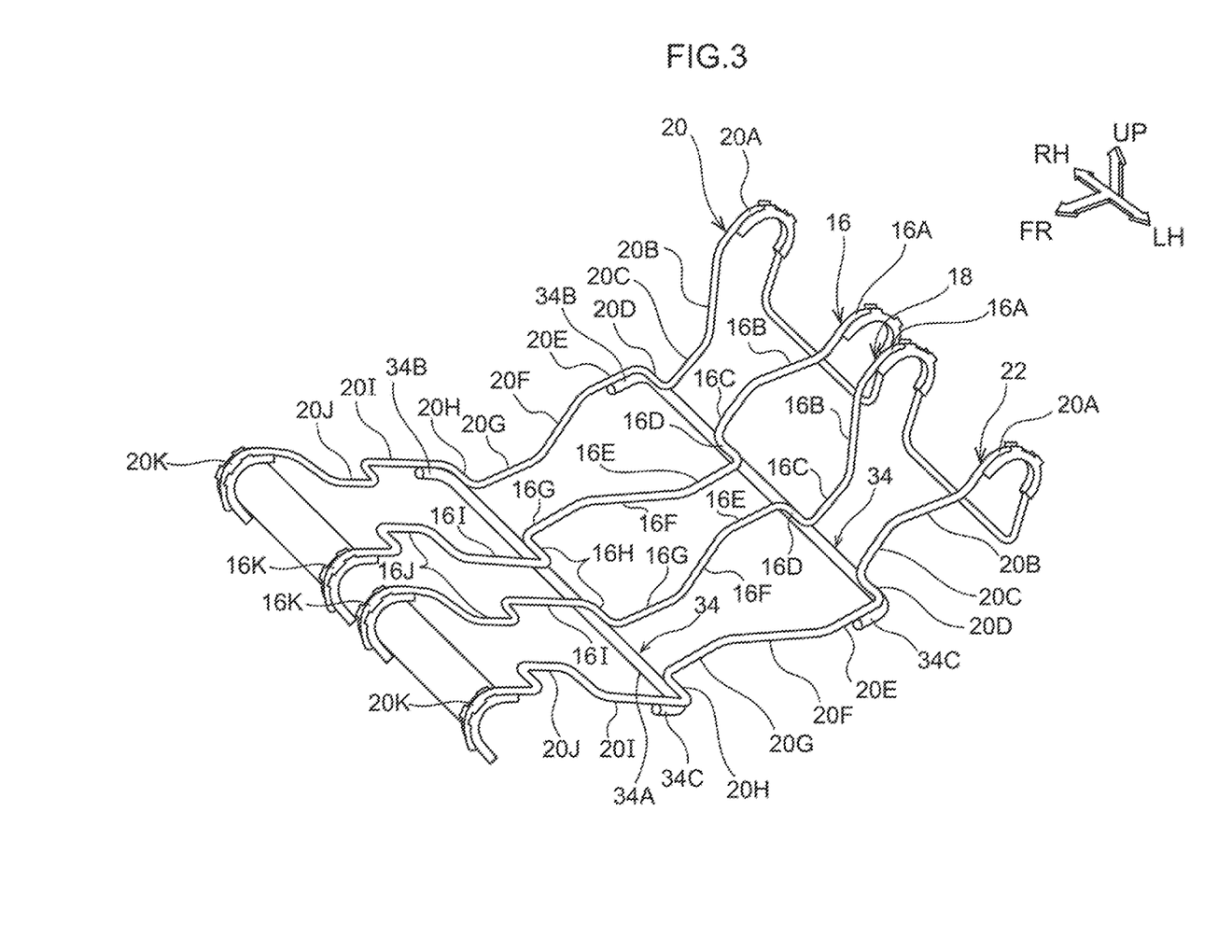
FIG. 3 is a perspective view illustrating a center section spring, two end section springs, etc.

As illustrated in FIG. 3, the right side center section spring 16 is formed, for example, by bending a rod shaped material formed using a steel material or the like. As illustrated in FIG. 2, the right side center section spring 16 spans across the seat front-rear direction and is disposed at the seat width direction right side of a bisector L that bisects the seat cushion 12 along the seat width direction. Specifically, as illustrated in FIG. 3, the right side center section spring 16 includes a rear side anchor portion 16A anchored to the rear frame 26 (see FIG. 1). The right side center section spring 16 also includes a first extension portion 16B that, from a front end of the rear side anchor portion 16A, slopes toward the seat lower side on progression toward the seat front side in a seat side view, and slopes toward the seat width direction outside on progression toward the seat front side in seat plan view. The right side center section spring 16 further includes a second extension portion 16C that slopes from a front end of the first extension portion 16B toward the seat lower side on progression toward the seat front side in seat side view, and a third extension portion 16D extending bending from a front end of the second extension portion 16C toward the seat width direction inside. The right side center section spring 16 further includes a fourth extension portion 16E extending bending from a seat width direction inside end portion of the third extension portion 16D toward the front side, and a fifth extension portion 16F sloping from a front end of the fourth extension portion 16E toward the seat width direction outside on progression toward the seat front side in seat plan view. The right side center section spring 16 further includes a sixth extension portion 16G extending from a front end of the fifth extension portion 16F toward the seat front side in seat side view, and a seventh extension portion 16H extending bending from a front end of the sixth extension portion 16G toward the seat width direction inside. The right side center section spring 16 further includes an eighth extension portion 16I extending sloping from a seat width direction inside end portion of the seventh extension portion 16H toward the upper side on progression toward the seat front side in seat side view. A recess shaped bend portion 16J, open toward the seat width direction inside, is formed to a front end portion of the eighth extension portion 16I. The right side center section spring 16 further includes a front side anchor portion 16K extending from a front end of the eighth extension portion 16I and is anchored to the front frame 28 (see FIG. 1).

As illustrated in FIG. 2, the left side center section spring 18 spans across the seat front-rear direction and is disposed at the seat width direction left side of the bisector L that bisects the seat cushion 12 along the seat width direction. As illustrated in FIG. 3, the left side center section spring 18 is formed with symmetry in the seat width direction to the right side center section spring 16 in seat plan view. Note that locations of the left side center section spring 18 corresponding to those of the right side center section spring 16 are appended with the same reference numerals as the respective portions of the right side center section spring 16.

The right side end section spring 20 is formed, for example, by bending a rod shaped material that has a larger wire diameter than the right side center section spring 16. As illustrated in FIG. 2, the right side end section spring 20 spans across the seat front-rear direction and is disposed at the seat width direction right side of the right side center section spring 16. Specifically, as illustrated in FIG. 3, the right side end section spring 20 includes a rear side anchor portion 20A anchored to the rear frame 26 (see FIG. 1). The right side end section spring 20 also includes a first extension portion 20B that, from a front end of the rear side anchor portion 20A, slopes toward the seat lower side on progression toward the seat front side in seat side view, and slopes toward the seat width direction inside on progression toward the seat front side in seat plan view. The right side end section spring 20 further includes a second extension portion 20C that slopes from a front end of the first extension portion 20B toward the seat lower side on progression toward the seat front side in seat side view, and a third extension portion 20D extending bending from a front end of the second extension portion 20C toward the seat width direction outside. The right side end section spring 20 further includes a fourth extension portion 20E extending bending from a seat width direction outside end portion of the third extension portion 20D toward the front side, and a fifth extension portion 20F sloping from a front end of the fourth extension portion 20E toward the seat width direction inside on progression toward the seat front side in seat plan view. The right side end section spring 20 further includes a sixth extension portion 20G extending from a front end of the fifth extension portion 20F toward the seat front side in seat side view, and a seventh extension portion 20H extending bending from a front end of the sixth extension portion 20G toward the seat width direction outside. The right side end section spring 20 further includes an eighth extension portion 20I extending sloping from a seat width direction outside end portion of the seventh extension portion 20H toward the upper side on progression toward the seat front side in seat side view. A recess shaped bend portion 20J, open toward the seat width direction outside, is formed to a front end portion of the eighth extension portion 20I. The right side end section spring 20 further includes a front side anchor portion 20K extending from a front end of the eighth extension portion 20I and is anchored to the front frame 28 (see FIG. 1).

As illustrated in FIG. 2, the left side end section spring 22 spans across the seat front-rear direction and is disposed at the seat width direction outside of the left side center section spring 18. As illustrated in FIG. 3, the left side end section spring 22 is formed with symmetry in the seat width direction to the right side end section spring 20 in seat plan view. Note that locations of the left side end section spring 22 corresponding to those of the right side end section spring 20 are appended with the same reference numerals as the respective portions of the right side end section spring 20.

As illustrated in FIG. 2, the respective portions of the right side center section spring 16, the left side center section spring 18, the right side end section spring 20, and the left side end section spring 22 explained above are disposed in the same positions in the seat up-down direction in a cross-section of the seat cushion 12 cut away along the seat width direction and the up-down direction. Note that, being in the same position in the seat up-down direction does not mean being positioned in exactly the same position, and there may be misalignment in the seat up-down direction proportional to variations in the dimensions of the right side center section spring 16, the left side center section spring 18, the right side end section spring 20, and the left side end section spring 22.

Figure 4:
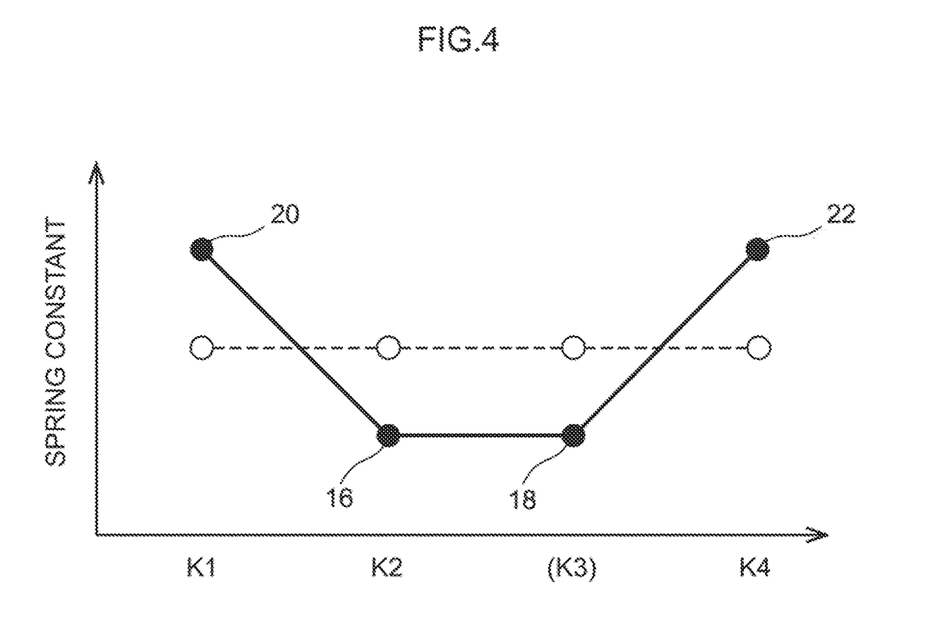
FIG. 4 is a graph illustrating spring constants of a center section spring and two end section springs.

In the present exemplary embodiment, since the right side end section spring 20 and the left side end section spring 22 are formed, for example, by bending a rod shaped material with a larger wire diameter than that of the right side center section spring 16 and the left side center section spring 18, the right side end section spring 20 and the left side end section spring 22 are less deformable in the seat up-down direction than the right side center section spring 16 and the left side center section spring 18. To describe this in detail, as illustrated in FIG. 4, spring constants K1 and K4 when the right side end section spring 20 and the left side end section spring 22 are deformed in the seat up-down direction are higher than spring constants K2 and K3 when the right side center section spring 16 and the left side center section spring 18 are deformed in the seat up-down direction. Note that the white circular plots illustrated in FIG. 4 indicate the spring constants K1 and K4 when a right side end section spring and a left side end section spring are deformed in the seat up-down direction, and the spring constants K2 and K3 when a right side center section spring and a left side center section spring are deformed in the seat up-down direction, in a conventional vehicle seat, which is set to with the same spring constant.

As illustrated in FIG. 3, a pair of stabilizer bars 34, serving as connecting members, are joined to the right side center section spring 16, the left side center section spring 18, the right side end section spring 20, and the left side end section spring 22, and are disposed with an interval along the seat front-rear direction therebetween. One stabilizer bar 34 is disposed at the seat front side of hip points P of the seated occupant H in seat side view (see FIG. 2). The other stabilizer bar 34 is disposed at the seat rear side of the hip points P of the seated occupant H. Note that the build of the seated occupant H (see FIG. 2) is the same build as an AM50 dummy, and the seated occupant H is seated in a standard posture in the vehicle seat 10 set to a standard usage state. The hip points P are points on the seat cushion pad 30 set according to an appropriate seated position for a seated occupant.

The stabilizer bars 34 are each configured including a base portion 34A extending along the seat width direction, and a right side bent portion 34B and a left side bent portion 34C respectively extending bending from both seat width direction end portions of the base portion 34A toward the front side. A right side end portion of the base portion 34A and the right side bent portion 34B of the stabilizer bar 34 disposed at the front side of the hip points P are joined to the seventh extension portion 20H and a rear end portion of the eighth extension portion 20I of the right side end section spring 20. A left side end portion of the base portion 34A and the left side bent portion 34C of the stabilizer bar 34 disposed at the front side of the hip points P are joined to the seventh extension portion 20H and a rear end portion of the eighth extension portion 20I of the left side end section spring 22. A seat width direction intermediate portion of the base portion 34A of the stabilizer bar 34 disposed at the front side of the hip points P is joined to the seventh extension portion 16H of the right side center section spring 16 and the seventh extension portion 16H of the left side center section spring 18.

A right side end portion of the base portion 34A and the right side bent portion 34B of the stabilizer bar 34 disposed at the rear side of the hip points P are joined to the third extension portion 20D and a rear end portion of the fourth extension portion 20E of the right side end section spring 20. A left side end portion of the base portion 34A and the left side bent portion 34C of the stabilizer bar 34 disposed at the rear side of the hip points P are joined to the third extension portion 20D and a rear end portion of the fourth extension portion 20E of the left side end section spring 22. A seat width direction intermediate portion of the base portion 34A of the stabilizer bar 34 disposed at the rear side of the hip points P is joined to the third extension portion 16D of the right side center section spring 16 and the third extension portion 16D of the left side center section spring 18.

Explanation follows regarding the operation and effects of the present exemplary embodiment.

As illustrated in FIG. 1 to FIG. 3, in the vehicle seat 10 of the present exemplary embodiment, load of the seated occupant H is supported by the seat cushion frame 14, and the right side center section spring 16, the left side center section spring 18, the right side end section spring 20, and the left side end section spring 22 spanning across the seat cushion frame 14. In the present exemplary embodiment, the spring constants K1, K2, K3 and K4 of the right side center section spring 16, the left side center section spring 18, the right side end section spring 20 and the left side end section spring 22 are set such that the right side end section spring 20 and the left side end section spring 22 are less deformable in the seat up-down direction than the right side center section spring 16 and the left side center section spring 18. Accordingly, the holding performance with respect to the seated occupant H tilting in the seat width direction may be improved.

In the present exemplary embodiment, the right side center section spring 16, the left side center section spring 18, the right side end section spring 20, and the left side end section spring 22 are connected together along the seat width direction by the pair of stabilizer bars 34. Therefore, the present exemplary embodiment enables increased reaction force toward the seat upper side to act on the seated occupant H from the right side end section spring 20 and left side end section spring 22 when the seated occupant H has tilted in the seat width direction. Accordingly, the holding performance with respect to the seated occupant H tilting in the seat width direction may be further improved.

In the present exemplary embodiment, the pair of stabilizer bars 34 are respectively disposed at the seat front side and rear side of the hip points P of the seated occupant H in seat side view (see FIG. 2). Accordingly, the holding performance with respect to the seated occupant H tilting in the seat width direction may be improved, and the seated occupant H from feeling any hardness in the seat cushion 12 may be suppressed.

In the present exemplary embodiment, an example in which the pair of stabilizer bars 34 are respectively disposed at the seat front side and rear side of the hip points P of the seated occupant H in seat side view, has been explained. However, the present disclosure is not limited thereto. For example, a single stabilizer bar 34 may be configured provided directly below the hip points P of the seated occupant H in seat side view. A configuration may also be applied in which the stabilizer bars 34 are not provided. Thus whether or not to provide the stabilizer bars 34, or the placement and number of the stabilizer bars 34, may be set as appropriate in consideration of factors such as a balance between ride comfort and holding performance.

In the present exemplary embodiment, an example in which the right side center section spring 16, the left side center section spring 18, the right side end section spring 20, and the left side end section spring 22 are connected together along the vehicle width direction by the stabilizer bars 34, has been described. However, the present disclosure is not limited thereto. A configuration may be applied, for example, in which a stabilizer bar serving as a connecting member connecting together the right side center section spring 16 and the right side end section spring 20, and a stabilizer bar serving as a connecting member connecting together the left side center section spring 18 and the left side end section spring 22 are provided in a row along the vehicle width direction.

Figure 5:
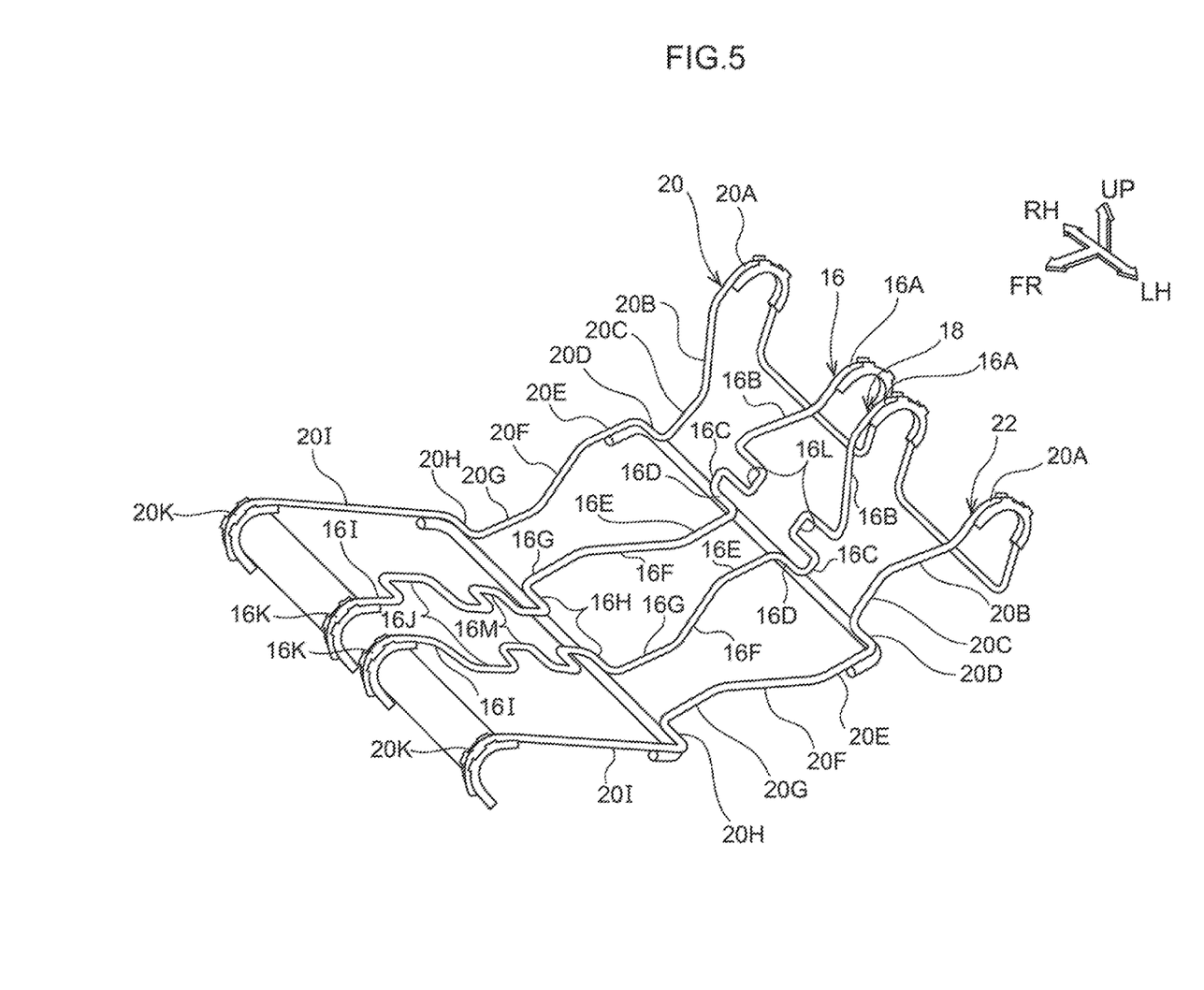
FIG. 5 is perspective view corresponding to FIG. 3, illustrating a center section spring, two end section springs, etc. according to a modified example.

In the present exemplary embodiment, an example in which, by making the wire diameter of the rod shaped material forming the right side end section spring 20 and the left side end section spring 22 different from the wire diameter of the rod shaped material forming the right side center section spring 16 and the left side center section spring 18, the spring constants K1 and K4 when the right side end section spring 20 and the left side end section spring 22 are deformed in the seat up-down direction are set higher than the spring constants K2 and K3 when the right side center section spring 16 and the left side center section spring 18 are deformed in the seat up-down direction, has been described. However, the present invention is not limited thereto. As illustrated in FIG. 5, for example, by adding recess shaped bend portions 16L, 16M to the second extension portions 16C and the eighth extension portions 16I of the right side center section spring 16 and the left side center section spring 18, and by removing the recess shaped bend portions 20J formed to the eighth extension portions 20I of the right side end section spring 20 and the left side end section spring 22 (see FIG. 3), the spring constants K1 and K4 when the right side end section spring 20 and the left side end section spring 22 are deformed in the seat up-down direction may be set higher than the spring constants K2 and K3 when the right side center section spring 16 and the left side center section spring 18 are deformed in the seat up-down direction.

In the present exemplary embodiment, an example in which the right side center section spring 16 and the left side center section spring 18 are provided at the seat width direction center section has been described. However, the present invention is not limited thereto. Configuration may be applied, for example, in which a single center section spring is provided at the seat width direction center section.

Although an exemplary embodiment of the present invention has been explained above, the present invention is not limited thereto, and obviously various other modifications may be implemented within a range not departing from the spirit of the present invention.

What is claimed is:

1. A vehicle seat comprising:
   a seat cushion frame that forms a frame of a seat cushion to support buttocks and thighs of a seated occupant;
   a center section spring that spans along a seat front-rear direction of the seat cushion frame at a center section in a seat width direction, the center section spring having a first extension portion that slopes downward from a rear of the seat cushion frame and a second extension portion that slopes downward from a front of the seat cushion frame;
   two end section springs, disposed at a same position in a seat up-down direction as the center section spring in a seat side view, that span along the seat front-rear direction of the seat cushion frame at two end sections in the seat width direction, each end section spring having a first extension portion that slopes downward from a rear of the seat cushion frame and a second extension portion that slopes downward from a front of the seat cushion frame; and
   a pair of connecting members that are formed of a rod shaped material, each of the connecting members disposed at a seat front side and a seat rear side, respectively, each of the connecting members being configured to: (1) be aligned with hip points of the seated occupant, and (2) link the center section spring to the two end section springs in the seat width direction,
   wherein the two end section springs are set with a higher spring constant than the center section spring,
   the first and second extension portions of the center section spring and the two end section springs extend in the seat width direction at a position where the pair of the connecting members are disposed, and
   the pair of the connecting members are disposed to overlap with and are joined to a lower end side of the first and second extension portions of the center section spring and the two end section springs.

2. The vehicle seat of claim 1, wherein the first and second extension portions of the two end section springs are formed of wires having a larger wire diameter than the first and second extension portions of the center section spring.

3. A vehicle seat comprising:
   a seat cushion frame that forms a frame of a seat cushion to support buttocks and thighs of a seated occupant;
   a center section spring that spans along a seat front-rear direction of the seat cushion frame at a center section in a seat width direction, the center section spring having a first extension portion that slopes downward from a rear of the seat cushion frame and a second extension portion that slopes downward from a front of the seat cushion frame; and
   two end section springs, disposed at a same position in a seat up-down direction as the center section spring in a seat side view, that span along the seat front-rear direction of the seat cushion frame at two end sections in the seat width direction, each end section spring having a first extension portion that slopes downward from a rear of the seat cushion frame and a second extension portion that slopes downward from a front of the seat cushion frame,
   wherein the two end section springs are set with a higher spring constant than the center section spring, and
   the first and second extension portions of the two end section springs are formed of wires having a larger wire diameter than the first and second extension portions of the center section spring.

4. The vehicle seat of claim 3, further including a connecting member that links the center section spring and the two end section springs in the seat width direction.

5. The vehicle seat of claim 4, wherein a pair of the connecting members are respectively disposed at a seat front side and a seat rear side of hip points of the seated occupant.

\* \* \* \* \*